UNITED STATES PATENT OFFICE.

EDGAR ARTHUR ASHCROFT, OF LONDON, ENGLAND.

ELECTROLYTIC MANUFACTURE OF ALKALI METALS.

1,106,436.        Specification of Letters Patent.     Patented Aug. 11, 1914.

No Drawing.      Application filed May 23, 1914. Serial No. 840,496.

*To all whom it may concern:*

Be it known that I, EDGAR ARTHUR ASHCROFT, a subject of the King of Great Britain, residing at 99 Buckingham Palace road, London, England, and Plumley, Bovey Tracey, England, have invented new and useful Improvements in the Electrolytic Manufacture of Alkali Metals, of which the following is a specification.

In the specifications of applications for patents, Serial Numbers, 683375, 683376, 683377, 683378 and 802582 processes are described in which two electrolytic cells are used for the production of alkali metals. In these processes, the raw material is electrolyzed in the first cell in which a cathode of molten metal, such as lead, is used and this, when it has taken up the alkali metal, is used as the anode in the second cell in which the alkali metal is liberated, an electrolyte which is not consumed being used. In these processes the electrolytes mentioned for use in the second cell are more especially alkali-hydroxid, alkali-halogenids, and similar salts, but these electrolytes have the disadvantage that they are fusible only with difficulty so that the product must be obtained at such a high temperature that it is difficult to remove it from the apparatus without burning. Moreover, on account of the difficultly fusible character of the aforesaid electrolytes undesirable results, such as the formation of crust and obstructions, are very liable to occur in the apparatus.

I have found that a mixture of alkali hydroxid and alkali cyanid, on account of its low melting point, is a most useful electrolyte for use in the second cell. The proportions of these two ingredients can vary within wide limits and, if desired, other salts can be added to the mixture. A very suitable mixture consists, for instance, of 60 parts by weight of sodium hydroxid and 40 parts by weight of sodium cyanid. Such a mixture commences to fuse at about 250° centigrade and is extraordinarily fluid so that the operation can be readily conducted without the formation of crusts, or stoppage of any passages in the apparatus. It has further the advantage that it will remain a long time entirely, or nearly, unchanged and will furnish a pure alkali metal with a very good current efficiency. If it should become altered in course of time by contact with moist air, for instance it can be easily regenerated.

The following is an example of how this invention may be carried out in practice, but I do not limit myself to this example.

In an apparatus constructed, for example, in a manner similar to that described in the specification of British Letters Patent No. 1003 A. D. 1912, the secondary cell is charged with 100 kilograms of an electrolyte having the following composition:—caustic soda 63 kilograms, sodium cyanid 30 kilograms, to which may be added sodium carbonate 7 kilograms. Instead of sodium carbonate the same proportion of sodium chlorid can be employed. Lead-sodium alloy is used as the anode, which alloy can be produced in a first cell in the usual, or any suitable, manner and may contain, for example, from 5, to 10 per cent. (by weight) of sodium. The intensity of the current employed can be, for instance, about 10,000 amperes. The electrolyte, and also the alloy of lead-sodium beneath it, should be kept in motion. The anode of the second cell is constantly returned to, and replenished with sodium in, the first cell. The temperature of the second cell should be maintained at between about 330° and 360° centigrade. It is in this way possible to work for a long time without interruption while alkali metal of great purity, or the required alkali metal compound, is obtained.

What I claim is:—

1. An electrolyte for use in the manufacture of alkali metals, containing as essential constituents, alkali hydroxid and alkali cyanid.

2. An electrolyte for use in the manufacture of metallic sodium, containing as essential constituents, caustic soda and sodium cyanid, in substantially the proportions of 63 parts by weight of caustic soda to 30 parts by weight of sodium cyanid.

In testimony whereof I have signed my name to this specification in the presence of two subscribing witnesses.

EDGAR ARTHUR ASHCROFT.

Witnesses:
     GILBERT FLETCHER LYONS,
     EDWARD GEORGE DAVIES.